United States Patent Office 3,545,284
Patented Dec. 8, 1970

3,545,284
ACCELERATION MEASURING SYSTEM
Oliver R. Clement, Milwaukee, Lynn David Lewis, Brookfield, and James F. Thompson, Wauwatosa, Wis., assignors to General Motors Corporation, Detroit, Mich., a corporation of Delaware
Filed Jan. 13, 1967, Ser. No. 609,037
Int. Cl. G01p 15/08
U.S. Cl. 73—517    4 Claims

ABSTRACT OF THE DISCLOSURE

Acceleration measuring apparatus including a test mass and forcer means for continuously cycling the mass about a reference point with a fixed period of cyclical displacement and the feedback loop includes a pulse width modulator synchronized with the fixed period for providing an indication of the extent of displacement of the mass about the reference point. The pulse width modulator determines the number of pulses accumulated by a digital counter. Phase displaced signals are used to allow switching devices in the loop to reach an acceptable state of quiescence before current switching takes place.

---

Acceleration of a physical body such as a missile or aircraft can be measured by means of an accelerometer including a test mass which is supported relative to the body so as to be sensitive to acceleration forces. Acceleration of the body causes the mass to be displaced away from a reference point in which the mass normally resides in the absence of external forces. An output signal may be generated in a closed loop system by measuring the energy required to rebalance the mass, that is, to force the mass back to the reference point against the acceleration force.

Typically, such a force-rebalance system statically balances the mass and produces an aperiodic analog output signal. If data processing is to be done in a digital computer, the analog signal must be asynchronously converted to digital form. Static balance introduces static friction which may produce a region of accelerometer insensitivity. In addition, analog type readout generally requires continuous variation in the energizing current for the force-rebalance system as well as accurate precalculation of system scale factors. Such continuous variation may introduce a nonlinearity into the acceleration sensitivity since the effect of the force-rebalance system may not be linear over its entire range of operation. In addition, an asynchronous system is difficult to monitor and to digitize since a digitizing period, or cycle length, which is arbitrarily defined may bear no constant relationship to the test mass displacement.

In accordance with the present invention the aforementioned difficulties are overcome by means of an acceleration measuring system in which a test mass is continuously cycled at a fixed frequency about a reference point. Moreover, the measurement system is synchronized with the test mass displacement period to provide a digital indication of acceleration acting upon the mass. The continuous cycling of the mass eliminates errors due to static friction. The cycle length of displacement is fixed by pulsing the force-rebalance means at a fixed frequency to establish a measurement period of fixed length. Several advantages accrue from such operation: first, the pulsed forcer means can be energized with current of constant magnitude but selectively reversible direction at the synchronizing rate thereby eliminating or making calibratible scale factor problems which may be directly or indirectly associated with current level; second, the readout cycle may be synchronized with the displacement cycle thereby permitting uniform digitizing; and third, the test mass displacement cycle is fixed in length thereby permitting the indication of displacement unbalance about the reference point by the accumulation of clock signals over only a portion of the displacement period.

These and other features and advantages of the invention can be best understood by reference to the following description of a specific embodiment to be taken with the accompanying drawings of which:

Figure 1:
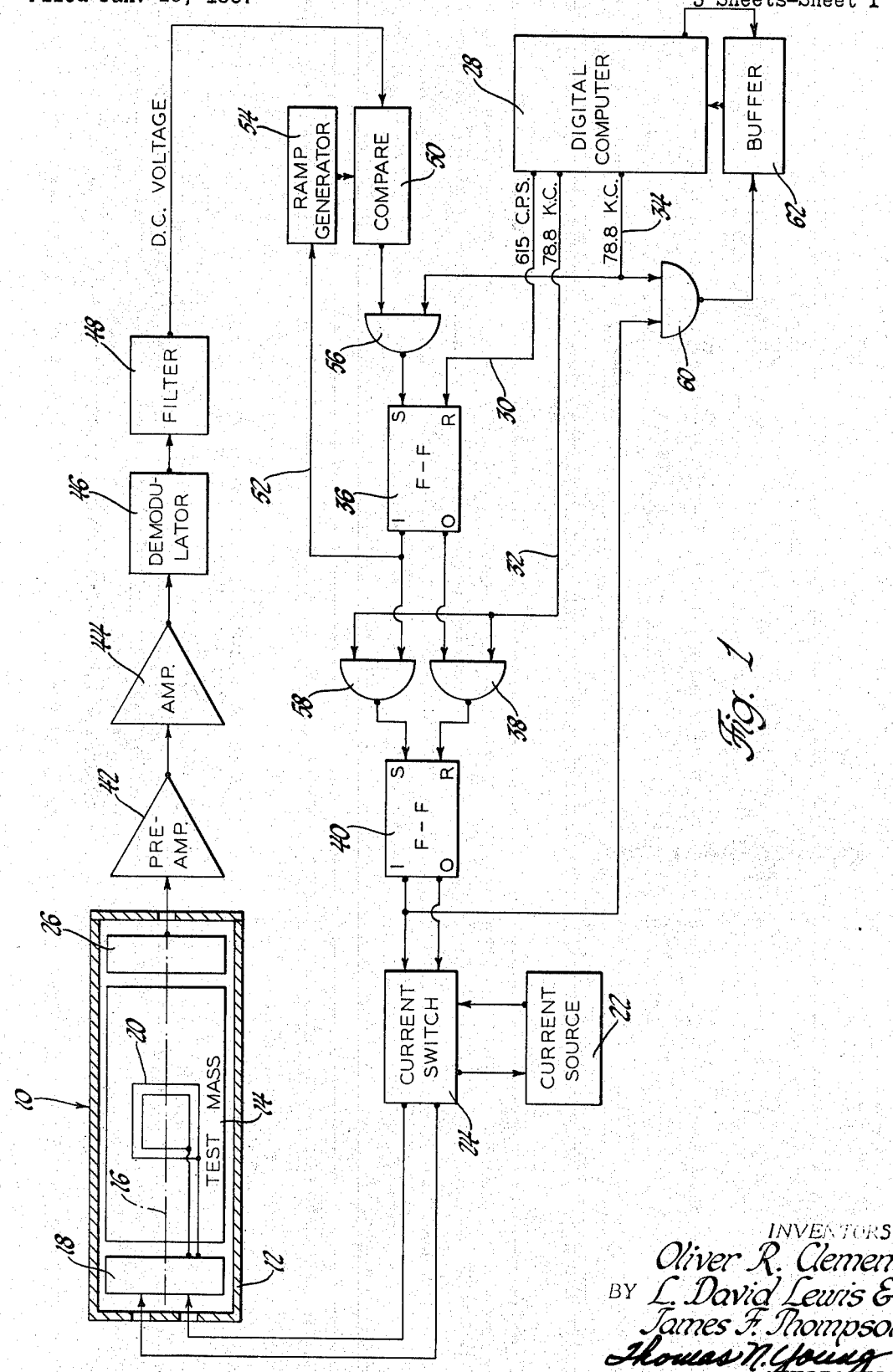
FIG. 1 is a block diagram of the specific embodiment illustrating the nature and interconnection of the components thereof.

In FIG. 1 an inertial sensing unit 10 includes a hollow housing 12 which may be filled with fluid or gases. Within the housing 12 a test mass 14 is supported by means, not shown, for relatively free displacement in opposite directions along an input axis 16 and about an axially central reference position. Any force acting upon mass 14 tends to displace it away from the reference position. Rebalance of mass 14 is accomplished by a closed loop system including an electromagnetic forcer 18 which may be taken to include a conductive coil 20 mounted on the mass 14. Although omitted for the sake of clarity, forcer 18 may further include means such as permanent magnets for producing a constant field transversely of the coil 20 such that energization of coil 20, with current of selected direction, produces a force urging mass 14 in a selected direction along axis 16. The forcer, as well as the entire unit 10, may be better understood by reference to a copending application Ser. No. 604,238 entitled Spring Suspension Accelerometer by Richard J. Ivers.

The current of selectable direction which is required by forcer is supplied by a regulated source 22 in combination with a bidirectional current switch 24. Switch 24 has two inputs which, when alternately energized, reverse the direction of current supplied by source 22 to coil 20.

Unit 10 further includes a pickoff 26 which may be of the electro-magnetic type. The pickoff is responsive to the axial travel of mass 14 to produce an output signal proportional to the degree of such travel as well as the direction. The nature, and utility, of this output signal will be further described below.

The central timing and data evaluation functions for the acceleration measurement system is provided by means of a digital computer 28 which may be a general purpose computer of the type commonly used in inertial navigation systems. Computer 28 includes means for producing, on output line 30, synchronizing signals in the form of voltage spikes which, in the specific example described, occur at the rate of 615 cycles per second. The signals establish a displacement cycle length for test mass 14 and a sampling or measurement cycle length for the remainder of the central electronics to be descrfibed. Computer 28 also produces, on output line 32, periodic pulses which occur at the rate of 78.8 kilocycles (kc.), 127 of these signals (128 intervals) occurring between two consecutive signals on line 30. The 78.8 kc. signals also appear on output line 34 but slightly lag the signals on line 32 to allow switching devices contained in the loop to reach an acceptable state of quiescence between occurrence of adjacent pulses.

To initiate the displacement period for mass 14 the 615 c.p.s. synchronizing signals on line 30 are conducted to the reset (R) input of a bistable multivibrator (flip-flop) 36. Flip-flop 36 has two outputs labeled "1" and "0." A reset signal on the "R" input causes a relatively constant voltage to appear at the "0" output. This voltage is delivered to the first input of an AND gate 38 along with the 78.8 kc. signals on line 32. The output of gate 38 is connected to the "R" input of a second bistable flip-flop 40, which may be referred to as the "control flip-flop." The "0" output of control flip-flop 40 is connected to one input of the current switch 24. Therefore the occurrence of a 615 c.p.s. signal on line 30, along with a 78.8 kc. signal on line 32, causes both inputs of gate 38 to be energized raising the voltage on the "0" output of flip-flop 40 and causing current of a first direction and constant magnitude to be supplied to forcer 18. This current causes the mass 14 to be urged in a first direction along axis 16.

The next pulse, which reverses the direction of current supplied to forcer 18, is generated by means of the following circuitry. Pickoff 26 is connected to a preamplifier 42 and an amplifier 44 which raises the pickoff signal to a more useable level. The amplified output is supplied to the series combination of a demodulator 46 and a filter 48. The output of filter 48 is a voltage, the magnitude of which indicates the extent to which the average position of mass 14 is displaced from the reference position, the polarity of which indicates the direction of displacement, and the frequency of which may be considered essentially D-C with respect to the synchronization frequency. The filter 48 characteristics are chosen such that the position indicated by its output voltage may be the average of several cycles of travel about the central reference position. This signal is supplied to the first input of a comparator 50. To provide a second input to comparator 50, the "1" output of flip-flop 36 is connected by means of conductor 52 to a wave form generator 54 to clamp the generator off. Generator 54 produces, in the absence of an input on line 52, a ramp or saw-toothed wave form which increases linearly as a function of time. This may be accomplished by charging a precision capacitor with a constant current. This linearly variable output is connected to comparator 50. Whenever the magnitude of the saw-toothed wave form exceeds that of the D-C signal, comparator 50 produces an output which is transmitted to the first input of an AND gate 56. Gate 56 is also connected to receive the 78.8 kc. signals on line 34. Therefore, upon coincidence of signals to gate 56 an output is transmitted to the "set" (S) input of flip-flop 36. This input raises the voltage on the "1" output of flip-flop 36 and supplies a first input to AND gate 58. The flip-flop 36, comparator 50, ramp generator 54, and AND gate 56 form a pulse width modulator of fixed period as determined by the 615 c.p.s. signal on line 30, but with a variable pulse width on the "1" output of flip-flop 36 dependent on the magnitude of the D-C signal. The 78.8 kc. signals on line 32 are also supplied to gate 58 such that a coincidence of these signals with an output from flip-flop 36 produces a signal to the "S" input of control flip-flop 40. This in turn raises the voltage on the "1" output of flip-flop 40 which voltage is transmitted to current switch 24 to reverse the direction of current supplied to forcer 18.

The "1" output of flip-flop 40 is also transmitted along with the signals on computer output line 34 an AND gate 60. When both signals are received by gate 60 the 78.8 kc. clock signals are passed to a buffer register 62 which accumulates the signals. Upon command from computer 28 the accumulated signals are transferred in serial form to the computer where a count is made as an indication of the accelerating forces acting upon mass 14.

It is well known that the shapes of rising and falling pulses prohibit instantaneous changes in levels and that the effect of their inherent difference in shapes varies with frequency, duration, and amplitude. Deterioration of precision due to these transients may be and, hereinby, is effectively avoided. First, the attendant errors are rendered constant by holding the frequency and amplitude of the pulses constant. Then the presence of these errors is assured under all extremes of operation by means of the ramp generator 54. Thus, the value of the precise ramp is always below the minimum output of the filter 48 at the beginning of the synchronization period and always exceeds the output of the filter or its maximum before the end of the period. This causes a torquer-current reversal to occur no sooner than a few torquer time constants after the commencement of the synchronization period or no later than a few time constants before its end, where the number of such time constants may be chosen to be compatible with the desired precision. And, thirdly, the error so preserved and perpetuated is employed as a calibrated constant in the torquing computations.

OPERATION

Figure 2:
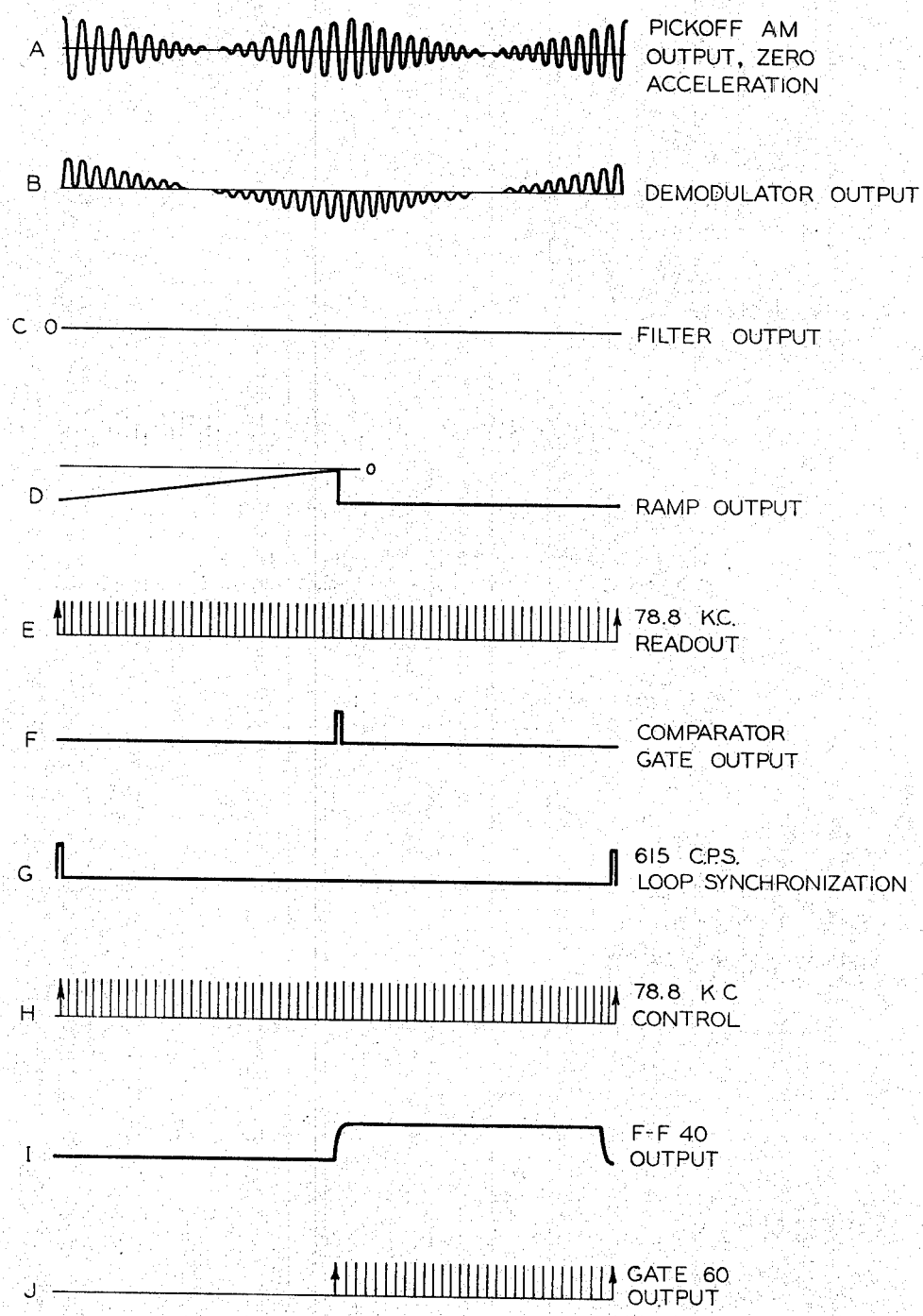
FIG. 2 is a wave form chart indicating the time relation of the signals which occur in the circuit of FIG. 1 under acceleration conditions.

Referring to FIG. 2, a description of the operation of the FIG. 1 embodiment under "0" acceleration conditions will be given. The 615 c.p.s. signals are shown on line G, plotted as a function of time. The first signal commences a displacement cycle of fixed length and a measurement cycle of corresponding duration. The 615 c.p.s. signal resets flip-flops 36 and 40 placing switch 24 in the first state and supplying current of constant magnitude and first direction to forcer 18. This urges the test mass 14 in one direction. Resetting of flip-flop 36 also removes the clamp signal previously appearing on line 52 and frees generator 54. The generator 54 thus produces the linearly increasing signal shown on line D of FIG. 2. At the same time pickoff 26 produces an amplitude modulated signal appearing on line A of FIG. 2 which varies as a function of the displacement of mass 14 from the central reference position. Demodulator 46 produces the alternating polarity envelope signal appearing on line B of FIG. 2 in which the positive portion indicates mass displacement to the left of the null position and the negative portion represents displacement to the right. The difference in slopes of the signals appearing on lines A and B arises from the difference in acceleration experienced by mass 14 as it travels faster in the direction of acceleration and slower in the opposite direction. Filter 48 produces a D-C level, shown on line C, which represents the average of the demodulated signal on line B. In the absence of an acceleration input test mass 14 cycles about the reference point spending equal portions of the measurement period on each side of the null position and thus the D-C level is zero. Comparator 50, which receives both the sawtoothed votage D and the D-C level C, produces a gate signal which is maintained until AND gate 56 resets flip-flop 36 and clamps the ramp from 54 as shown in line F whenever the saw-toothed signal exceeds the D-C level. Under zero acceleration conditions the gate signal occurs exactly halfway between two consecutive 615 c.p.s. signals on line G. Gate signal F, along with a 78.8 kc. signal (FIG. 2) E on line 34, passes through gate 56 setting flip-flops 36 and 40. In addition, the "1" output of flip-flop 36 restores the clamp voltage on line 52 to generator 54 and prepares the generator for the next measurement cycle. Setting flip-flop 40 raises the "1" output voltage of flip-flop 40, as shown on line I, reversing switch 24 and supplying current of opposite direction to forcer 18. Thus, this current reversal corresponds in time to the peaks of the signals appearing on lines A and B and in effect causes such peaks. In addition, the "1" output of control flip-flop 40 opens gate 60 to pass the 78.8 kc. signals on line 34 to buffer 62, as shown on line J. Since the "1" output of flip-flop 40 persists until the next 615 c.p.s. signal on line 30, buffer 62 receives sixty-four of 78.8 kc. pulses. The computer 28 is preset to interpret the receipt of sixty-four pulses as an indication of the "0" acceleration condition. Any count other than sixty-four is interpreted by computer 28 as an acceleration reading, the particular count either more or less than sixty-four being an indication of the magnitude as well as the direction of the acceleration.

Briefly summarizing, the production of 615 c.p.s. synchronizing signal has three primary effects: first, it sets switch 24 in one condition to urge the mass 14 in a first direction; second, it initiates the saw-toothed voltage output of generator 54; and third, it resets flip-flop 40 closing gate 60 so that no digital pulses are received by buffer 62. The production of a gate signal by comparator 50 also produces three primary effects: first, it sets switch 24 in the opposite condition reversing the direction of current flow to forcer 18; second, it terminates the output of generator 54; and third, it opens gate 60 so that pulses are accumulated by buffer 62.

The above description of operation also illustrates several of the inherent advantages of the invention. First, forcer 18 is supplied with current of constant magnitude but reversible direction thus fixing the effects of scale factor inaccuracies in the forcer and making them calibratible; second, the 615 c.p.s. signals establish a displacement cycle of fixed length and a measurement cycle of a fixed and corresponding length; third, the embodiment provides an inherently accurate digitizing method in which digital signals need be accumulated only over a portion of the displacement cycle. Therefore, it is not necessary to determine the ratio of counts which are accumulated over both halves of a displacement cycle.

Figure 3:
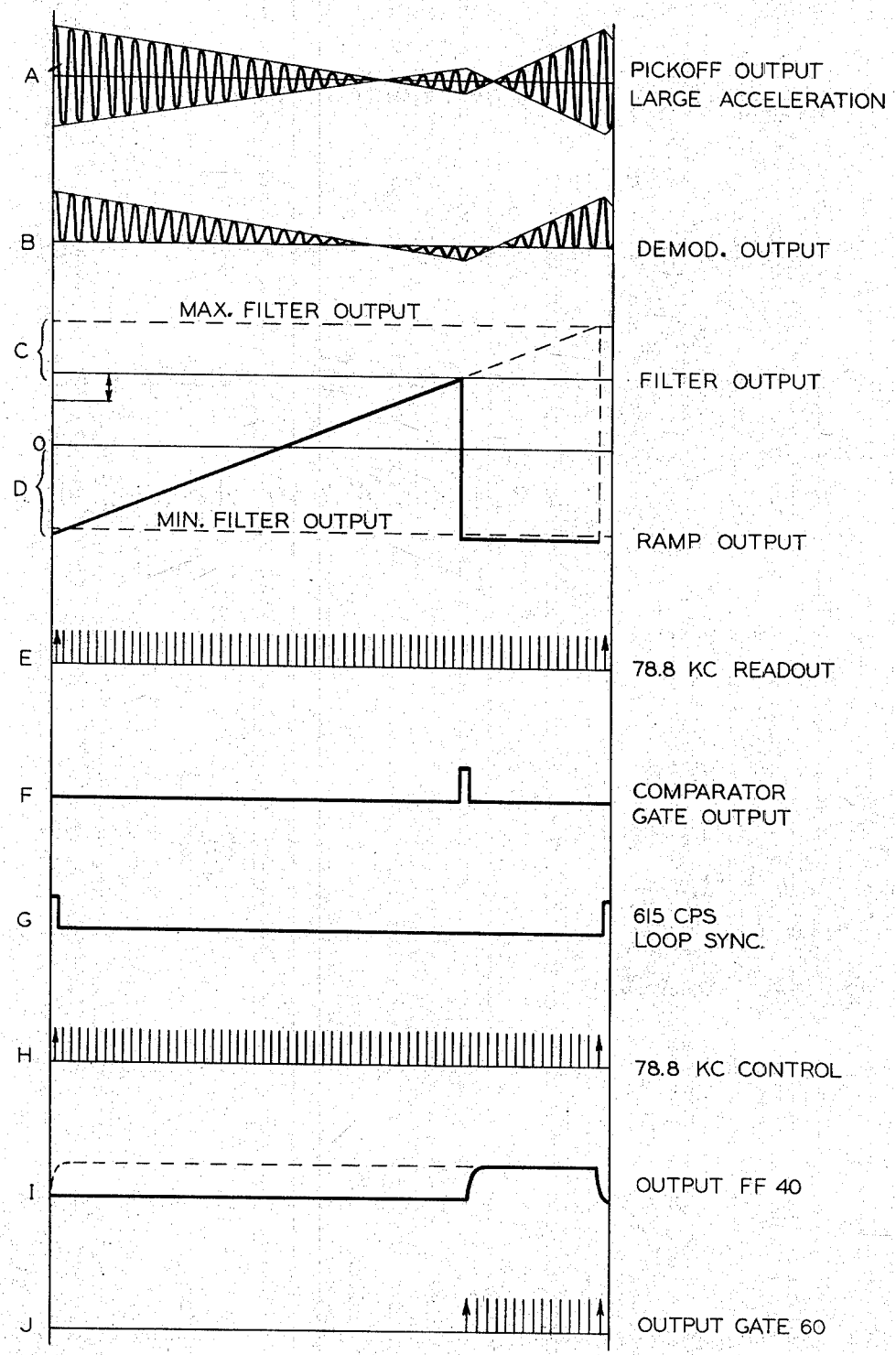
FIG. 3 is a wave form chart indicating the time relation of the signals which occur in the circuit of FIG. 1 under an arbitrarily selected large acceleration.

Referring to FIG. 3, a description of the operation of the FIG. 1 embodiment under an arbitrarily selected large acceleration will be given. It is assumed that the acceleration force operates to the left along axis 16; that is, unit 10 is accelerated to the right. Accordingly, the amplitude modulated output of pickoff 26 takes the form shown on line A. Demodulating and filtering the signal produces a D-C output signal which is increased over that of FIG. 2(C) indicating that the average position of test mass 14 is shifted to the left of the null or reference point. The increased D-C signal supplied to the first input of comparator 50 requires a longer increase time for generator 54 to reach and exceed the D-C level as shown on line D. Accordingly, the gate output on line F occurs later than half-way through the loop synchronizing period since the average position of mass 14 does not correspond to the central reference position as was previously the case. The late occurrence of the gate pulse produces two effects: first, current switch 24 is reversed later in time thus producing a compensating force influence on mass 14; and second, gate 60 is opened to the pulses on line 34 for only a short portion of the measurement period as shown on line "I" of FIG. 3. Buffer 62 therefore accumulates a clock pulse count less than sixty-four during the time between the gate pulse FIG. 3(F) and the next following 615 c.p.s. pulse FIG. 3(G). Upon transfer of the accumulated count to computer 28 a comparison of the count with the nominal value of sixty-four is made to indicate the magnitude and direction of the acceleration acting upon mass 14.

An acceleration in the opposite direction from that described above would lower the value of the D-C signal causing an early correspondence between the D-C signal and the linearly increasing voltage thus producing gate pulse F at an earlier time in the measurement period. Gate 60 would thus be open to receive more than sixty-four pulses, the difference between the actual count and sixty-four, again indicating the magnitude and direction of the acceleration. Obviously, the gate 60 may be connected to the "0" output of control flip-flop 40 to be opened during the first portion of the measurement cycle. The computer would, of course, be adjusted to equate counts more than sixty-four with positive accelerations and counts less than sixty-four with negative accelerations.

The designed capability of the loop may be exceeded when exposed to short term accelerations or shocks outside its range. These might arise from performance tests, vibration tests, sound and barrier penetration, ordnance impacts, etc. The effects of these extreme conditions would require the loop to exercise its maximum capability and may be, and herein are, effectively prevented from deteriorating the otherwise-effected inherent precision of the loop. Accordingly, as may be understood with reference to the dotted portions of waveforms C, D, and I, the magnitude of the ramp and filter outputs are such that flip-flop 40 changes state between some short period after the start of the cycle and a short period before its end.

It is to be understood that the foregoing description refers to an illustrative embodiment of the invention and is not to be construed in the limited sense. For example, it is clear that the measurement and conversion techniques described above are not confined to acceleration measurement, but may be advantageously applied to other devices, such as gyroscopes in which a mass is subject to displacement in at least two directions in response to an input of the direction and extent of displacement are to be determined. For a definition of the invention reference should be taken to the appended claims.

What is claimed is:

1. In combination with an inertial instrument comprising a mass which is bidirectionally displaceable from a reference position, forcer means selectively actuable to urge the mass in either direction and pickoff means for developing a modulated output signal indicative of the position of said mass relative to said reference position; a force-rebalance loop comprising means for developing a first periodic signal of fixed period, means for developing second and third phased displaced periodic signals at a high frequency as compared to the frequency of said first signal, means responsive to said modulated output signal for developing an essentially D-C signal of a magnitude proportional to the average position of said mass relative to said reference position, pulse width modulator means responsive to said D-C signal for developing a first output which is synchronized with said first signal and a second output which is synchronized with said second signal and occurs within said fixed period at a time dependent on the magnitude of said D-C signal, means providing a constant magnitude current, switch means connected between said source and said forcer means and selectively actuable to reverse the direction of said current in said forcer means, switch control means responsive to said first and second outputs of said pulse width modulator means and said third signal for developing third and fourth outputs respectively, and synchronized by said third signal for actuating said switch means.

2. The combination claimed in claim 1 wherein said switch control means comprises first and second AND gates each of which is connected to said third signal and respectively responsive to said first and second outputs, a flip-flop responsive to the respective outputs of said first and second AND gates for developing said third and fourth outputs respectively.

3. In combination with an inertial instrument comprising a mass which is bidirectionally displaceable from a reference position, forcer means selectively actuable to urge the mass in either direction and pickoff means for developing a modulated output signal indicative of the position of said mass relative to said reference position; a force rebalance loop comprising means for developing a first periodic signal of fixed period, means for developing second and third phase displaced periodic signals at a high frequency as compared to the frequency of said first signal, means responsive to said modulated output signal for developing an essentially D-C signal representing the average position of said mass relative to said reference position, a ramp generator for producing a linearly increasing signal extending between minimum and maximum values which are respectively below and above the possible minimum and maximum values of said D-C signal, comparator means for comparing the D-C signal and linearly increasing and providing an output when said linearly increasing signal exceeds said D-C signal, an AND gate responsive to the output of said comparator and said second signal, a flip-flop producing a first output in response to an output from said AND gate, said ramp generator being controlled by said first output of said flip-flop whereby the ramp generator is returned to an inactive state upon occurrence of said first output and means connecting the other input of said flip-flop to said means for producing said first signal whereby a second output is obtained from said flip-flop in synchronism with said first signal, means providing a constant magnitude current, switch means connected between said constant magnitude current means and said forcer means and selectively actuable to reverse the direction of said current in said forcer means, switch control means comprising second and third AND gates each of which is connected to said third signal and respectively connected to said first and second outputs of said flip-flop, a second flip-flop responsive to the respective outputs of said second and third AND gates for developing third and fourth outputs synchronized with said third signal for actuating said switch means.

4. In combination with an inertial instrument comprising a mass which is bidirectionally displaceable from a reference position, forcer means selectively actuable to urge the mass in either direction and pickoff means for developing a modulated output signal indicative of the position of said mass relative to said reference position; a force rebalance loop comprising means for developing a first periodic signal of fixed period, means for developing second and third phase displaced periodic signals at a high frequency as compared to the frequency of said first signal, means responsive to said modulated output signal for developing an essentially D-C signal representing the average position of said mass relative to said reference position, a ramp generator for producing a linearly increasing signal extending between minimum and maximum values which are respectively below and above the possible minimum and maximum values of said D-C signal, comparator means for comparing the D-C signal and linearly increasing signals and providing an output when said linearly increasing signal exceeds said D-C signal, and AND gate responsive to the output of said comparator and said second signal, a flip-flop producing a first output in response to an output from said AND gate, said ramp generator being controlled by said first output of said flip-flop whereby the ramp generator is returned to an inactive state upon occurrence of said first output and means connecting the other input of said flip-flop to said means for producing said first signal whereby a second output is obtained from said flip-flop in synchronism with said first signal, means providing a constant magnitude current, switch means connected between said constant magnitude current means and said forcer means and selectively actuable to reverse the direction of said current in said forcer means, switch control means comprising second and third AND gates each of which is connected to said third signal and respectively connected to said first and second outputs of said flip-flop, a second flip-flop responsive to the respective outputs of said second and third AND gates for developing third and fourth outputs synchronized with said third signal for actuating said switch means, a fourth AND gate responsive to coincidence of said second signal and one of said outputs of said second flip-flop, register means for accumulating the pulses passed by said fourth AND gate and computer means for comparing the accumulated pulse count with a reference count to determine the force acting upon the mass.

References Cited
UNITED STATES PATENTS

| | | | |
|---|---|---|---|
| 3,028,550 | 4/1962 | Naydan et al. | 324—70 |
| 3,192,371 | 6/1965 | Brahm | 235—183 |
| 2,049,129 | 7/1936 | McNeil | 73—517 |
| 2,819,052 | 1/1958 | Dudenhausen | 73—517 |
| 2,979,960 | 4/1961 | Johnson | 73—517 |
| 2,846,207 | 8/1958 | Marggras | 73—517 |
| 2,940,306 | 6/1960 | Lozier | 73—517 |

JAMES J. GILL, Primary Examiner

H. GOLDSTEIN, Assistant Examiner